No. 826,490. PATENTED JULY 17, 1906.
J. H. SWAIN.
TIRE.
APPLICATION FILED JULY 25, 1905.
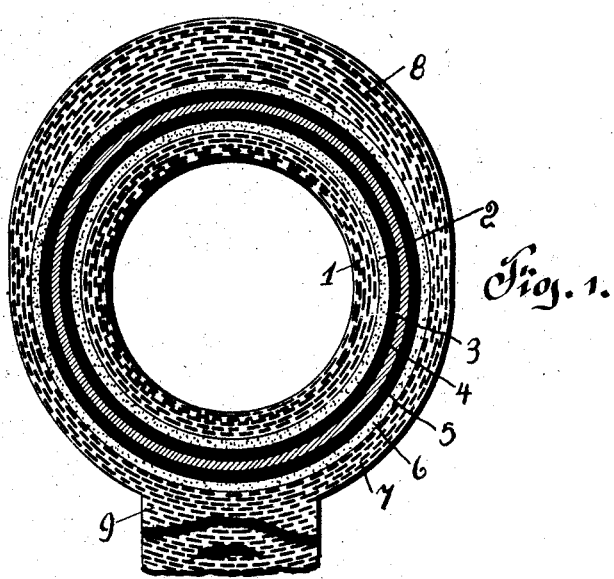
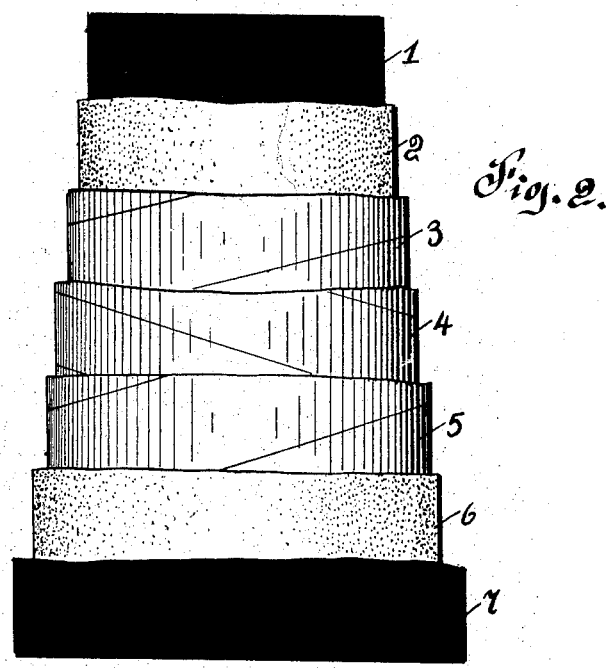

UNITED STATES PATENT OFFICE.

JAMES H. SWAIN, OF PITTSBURG, PENNSYLVANIA, ASSIGNOR, BY MESNE ASSIGNMENTS, TO H. M. & S. ARMORED TIRE COMPANY, INCORPORATED, OF PITTSBURG, PENNSYLVANIA, A CORPORATION OF PENNSYLVANIA.

TIRE.

No. 826,490.

Specification of Letters Patent.

Patented July 17, 1906.

Application filed July 25, 1905. Serial No. 271,184.

*To all whom it may concern:*

Be it known that I, JAMES H. SWAIN, a citizen of the United States of America, residing at Pittsburg, in the county of Allegheny and State of Pennsylvania, have invented certain new and useful Improvements in Tires, of which the following is a specification, reference being had therein to the accompanying drawings.

This invention relates to certain new and useful improvements in tires; and the invention has for its object to provide a non-leakable, puncture-proof, and impenetrable tire which will be strong and durable and comparatively inexpensive to manufacture.

My present invention is a species of the invention disclosed in my accompanying applications, filed under even date, in which I have claimed certain novel features also shown in this application, but not claimed. In these applications I deal with tires consisting of an inner and outer tube, between which is interposed wrappings or layers of vulcanized fiber and canvas; and the present invention aims to provide novel means for materially strengthening and increasing the longevity of a tire.

The embodiment of the invention which is illustrated in the best form will be more fully described in the following description and claims.

Referring to the drawings, Figure 1 is a cross-sectional view of a tire constructed in accordance with my invention. Fig. 2 is a fragmentary plan of the tire, illustrating the different layers or wrappings of material which compose the tire.

In this application I construct my improved tire of an inner tube 1, preferably formed of rubber, and surrounding the tube is a flexible layer or wrapping of material 2, such as canvas. Upon this layer of canvas is wrapped a vulcanized-fiber wrapper 3, which is preferably made in strips and spirally wound around the canvas, as illustrated in Fig. 2 of the drawings. Surrounding this vulcanized-fiber wrapper is a wrapping of thin steel 4, which is also preferably made in strips and spirally wound around the vulcanized-fiber wrapper 3 in an opposite direction, this wrapping of steel serving to establish a resilient tire of sufficient strength to withstand the internal pressure exerted upon the same when filled with air and the external pressure when used upon the wheels of motor-driven vehicles, such as automobiles. Another layer or wrapping of vulcanized fiber 5 is placed around the steel wrapping 4, this wrapping 5 being wound in an opposite direction to the steel wrapping 4 and in a similar direction to the first-mentioned vulcanized-fiber wrapping 3. Another wrapping of canvas 6 is placed upon the wrapping of material just described, and inclosing the various wrappings or layers of the tire is an outer tube 7, having an enlarged treaded portion 8. This tube, which is preferably constructed of rubber, is provided with an annular rim-seat 9, which is employed for securing the tire upon the rim of a wheel, the manner of securing the tire upon a wheel being the subject-matter of an accompanying application.

In interposing a steel wrapping between the wrappings of vulcanized fiber of the tire I insure the inner tube 1 of the tire against puncture, and as this steel wrapping is preferably formed of very thin resilient steel and arranged spirally within the tire, a spring-like resiliency is given to the tire, and at the same time this steel wrapping serves to strengthen and fortify the tire against collapse.

In constructing my improved tire I have found that the vulcanized fiber which I employ, together with the steel wrapping, has certain characteristics which are an advantage in the use of the tire. For instance, I have found that the frictional contacting of the spirally-wound steel wrapping with the vulcanized fiber causes the steel wrapping to wear. Consequently before the indurate surface of the vulcanized fiber becomes so worn as to render the tire susceptible to a puncture the steel wrapping will have first become worn out; but as this frictional wearing of the steel wrapping is so slight it is possible that the exterior of the tire will become worn before the steel wrapping needs renewing. The advantage gained by using a steel wrapping provides a construction which is positively puncture-proof, and while certain incisions may be made in the vulcanized exterior layer or wrapping it will be impossible for such incisions to affect the steel wrapping to materially damage the tire.

While I have shown the preferred arrangement of the different parts of my improved tire, it is obvious that it may be slightly modified without departing from the scope of the invention. So, also, I do not confine myself to the manner of securing the tire to a wheel, but preferably employ such means as described and claimed in the accompanying applications.

What I claim, and desire to secure by Letters Patent, is—

1. A tire consisting of a tube, canvas surrounding said tube, vulcanized fiber spirally wound around said canvas, a wrapping of thin steel spirally wound around said vulcanized fiber, in an opposite direction thereto, vulcanized fiber spirally wound around said steel in an opposite direction to said steel, canvas surrounding said vulcanized fiber, a tube surrounding the last-named canvas, said tube having an enlarged tread, and a rim-seat carried by said tube, substantially as described.

2. A tire consisting of an inner tube, canvas surrounding said tube, vulcanized fiber surrounding said canvas, strips of steel spirally wound around said fiber, vulcanized fiber spirally wound around said steel, canvas surrounding said fiber, and a tube surrounding said canvas and having an enlarged portion, substantially as described.

3. A tire consisting of a tube, flexible material surrounding said tube, vulcanized fiber spirally wound around said material, steel strips spirally wound around said fiber in an opposite direction, canvas surrounding said steel, and a tube surrounding said canvas, substantially as described.

4. In a pneumatic tire, an inner tube, and an outer tube, a wrapping of thin ribbon-like steel around the inner tube, and a wrapping of thin vulcanized fiber around the steel wrapping.

5. In a pneumatic tire, an inner tube and an outer tube, and three superposed protective wrappings around the inner tube, the intermediate wrapping being of thin ribbon-like steel, and the inner and outer wrapping being each of vulcanized fiber wrapped spirally in reverse directions.

6. In a pneumatic tire, an air-tube, and three superposed protective wrappings therefor, the intermediate wrapper of the three being of thin ribbon-like steel wound spirally, and the inner and outer wrapping being of thin vulcanized-fiber strips wound spirally reverse to the winding of the steel.

7. In a pneumatic tire, an air-tube and two spirally-wound protective wrappings therefor, one of said wrappings being of thin ribbon-like steel and the other of thin vulcanized fiber.

8. In a pneumatic tire, an inner tube, a surrounding wrapping of fibrous material, a spirally-wound wrapper of vulcanized fiber on the fibrous material, a spirally-wound wrapper of thin ribbon-like steel on the vulcanized-fiber wrapper, and a second vulcanized-fiber wrapper on the steel wrapper.

9. In a pneumatic tire, an inner tube, a surrounding wrapping of fibrous material, a thin vulcanized-fiber strip wound on the fibrous material, a thin ribbon-like steel strip wound on the vulcanized-fiber wrapping, a second vulcanized-fiber strip wound on the steel wrapper, and a surrounding outer tube.

10. In a pneumatic tire, an inner tube, a surrounding wrapping of fibrous material, a thin vulcanized-fiber strip wound on the fibrous material, a thin ribbon-like steel strip wound on the vulcanized-fiber wrapper, a second vulcanized-fiber strip wound on the steel wrapping, a fibrous wrapper around said second vulcanized-fiber wrapper, and a surrounding outer tube.

In testimony whereof I affix my signature in the presence of two witnesses.

JAMES H. SWAIN.

Witnesses:
K. H. BUTLER,
J. A. MEANS.